(12) United States Patent
Squire et al.

(10) Patent No.: US 7,139,838 B1
(45) Date of Patent: Nov. 21, 2006

(54) APPARATUS AND METHOD OF DISTRIBUTING ROUTING INFORMATION

(75) Inventors: Matthew Squire, Raleigh, NC (US); Haldon J. Sandick, Durham, NC (US)

(73) Assignee: Nortel Networks Limited (CA)

( * ) Notice: Subject to any disclaimer, the term of this patent is extended or adjusted under 35 U.S.C. 154(b) by 596 days.

(21) Appl. No.: 09/690,393

(22) Filed: Oct. 17, 2000

Related U.S. Application Data

(60) Provisional application No. 60/160,649, filed on Oct. 21, 1999.

(51) Int. Cl.
*G06F 15/173* (2006.01)

(52) U.S. Cl. ...................................... 709/242; 709/238

(58) Field of Classification Search .............. 709/230, 709/238–242, 235, 249; 370/351, 356, 237–238
See application file for complete search history.

(56) References Cited

U.S. PATENT DOCUMENTS

| | | | | |
|---|---|---|---|---|
| 5,506,838 A * | 4/1996 | Flanagan | ...................... | 370/258 |
| 6,058,113 A * | 5/2000 | Chang | ......................... | 370/390 |
| 6,069,895 A * | 5/2000 | Ayandeh | ..................... | 370/399 |
| 6,392,997 B1 * | 5/2002 | Chen | ............................ | 370/252 |
| 6,418,476 B1 * | 7/2002 | Luciani | ....................... | 709/238 |
| 6,535,507 B1 * | 3/2003 | Li et al. | ...................... | 370/356 |
| 6,553,423 B1 * | 4/2003 | Chen | ............................ | 709/230 |
| 6,560,654 B1 * | 5/2003 | Fedyk et al. | ................ | 709/239 |
| 6,563,822 B1 * | 5/2003 | Aoki | ............................ | 370/390 |
| 6,567,380 B1 * | 5/2003 | Chen | ........................... | 370/238 |
| 6,584,093 B1 * | 6/2003 | Salama et al. | .............. | 370/351 |
| 6,603,756 B1 * | 8/2003 | Tappan | ....................... | 370/351 |
| 6,631,122 B1 * | 10/2003 | Arunachalam et al. | ..... | 370/332 |
| 6,636,895 B1 * | 10/2003 | Li et al. | ...................... | 709/238 |
| 6,704,795 B1 * | 3/2004 | Fernando et al. | ........... | 709/237 |
| 6,708,209 B1 * | 3/2004 | Ebata et al. | ................. | 709/223 |
| 6,711,152 B1 * | 3/2004 | Kalmanek et al. | .......... | 370/351 |
| 6,801,502 B1 * | 10/2004 | Rexford et al. | ............. | 370/235 |
| 6,820,134 B1 * | 11/2004 | Zinin et al. | ................. | 709/238 |

OTHER PUBLICATIONS

Squire, Matthew, "A Gateway Location Protocol," Internet Draft, draft-ietf-iptel-glp-00.txt, Feb. 16, 1999.
Traina, Paul, "Autonomous System Confederations for BGP," IETF RFC 1965, Jun. 1996.
Lucia, et al., "Server Cache Synchronization Protocol (SCSP)," Standards Track, Apr. 19, 1998.
"Using the Border Gateway Protocol for Interdomain Routing," http://www.cisco.com/univercd/cc/td/doc/cisintwk/ics/icsbgp4.ht, Oct. 14, 1999.
Y. Rekhter & T. Li, "A Border Gateway Protocol 4 (BGP-4)," IETF RFC 1771, Mar. 1995.
J. Moy, OSPF Version 2, IETF FRC 2328, Apr. 1998.

* cited by examiner

*Primary Examiner*—Abdullahi Salad
(74) *Attorney, Agent, or Firm*—McGuinness + Manaras LLP

(57) ABSTRACT

Routing information is distributed interdomain using a policy-based protocol and intradomain by flooding. A network device receives a message with routing information from outside its domain and applies policy. Policy filtered routing information is flooded throughout the domain of the network device. A link state advertisement header is added to the routing information to perform flooding. Policy is also applied to flooded routing information before sending such message to another domain.

23 Claims, 3 Drawing Sheets

APPARATUS AND METHOD OF DISTRIBUTING ROUTING INFORMATION

The present application claims priority from U.S. Patent Application No. 60/160,649, filed Oct. 21, 1999, the full disclosure of which is hereby incorporated by reference herein.

FIELD OF THE INVENTION

The invention generally relates to distribution of routing information between or within domains of network devices.

BACKGROUND OF THE INVENTION

The Boarder Gateway Protocol (BGP) is a policy centered protocol that provides for interdomain connectivity. The ability to apply policy permits very flexible methods of route selection and determination. However, in accordance with BGP protocol, each router within a domain must have a consistent view of the network outside of its domain. In order to satisfy this requirement, a single domain of network devices is required to have complete connectivity between its various network devices. This is accomplished using combinations of route reflectors and meshes. BGP has added the concept of confederations to intradomain BGP topology. Use of confederations is discussed in "Autonomous System Confederations for BGP", P. Traina, IETF RFC 1965, the full disclosure of which is hereby incorporated by reference herein. Confederations provide additional hierarchy within a BGP domain. Due to the requirement for intradomain connectivity for BGP routers, it is difficult to scale the use of BGP to large domains.

SUMMARY OF THE INVENTION

In accordance with one aspect of the invention, an apparatus and method of distributing routing information to a plurality of network devices in a single, policy based domain floods such domain with policy filtered routing information. Specifically, an information message is received from outside the domain having routing information. A given policy may then be applied to the routing information in the information message. When policy filtered routing information is thus produced, if it is to be distributed within the domain, it is flooded to the plurality of network devices in the single domain.

In preferred embodiments, policy is applied when an information message is received from another network device in a different domain or when an information message is considered for sending to a different domain. The plurality of network devices may be in any arbitrary connectivity. For example, they may be in a ring connectivity. In some embodiments, the plurality of network devices comprises at least three network devices that include a given network device. The given network device is connected with no more than one other of the plurality of network devices. In other embodiments, the routing information is flooded by adding a link state advertisement header. The policy filtered routing information may include the received routing information in the information message. The routing information may be stored in a local data storage. The policies may be set by an administrator.

DESCRIPTION OF PREFERRED EMBODIMENTS

In preferred embodiments of the invention, a policy based, inter-router protocol utilizes flooding to distribute routing information within a single domain. As known by those skilled in the art, a policy based protocol is a protocol that forwards and/or processes routing information received from another domain in a manner that is prescribed by a network administrator controlling the single domain. Such manner may be any arbitrary manner. For example, a policy may alter the costs or preferences associated with particular routes. Another type of policy may be used to preclude distribution within the domain of routing data from a selected third party domain. The policy based principles of BGP are utilized in implementing preferred embodiments of the invention.

Figure 1:
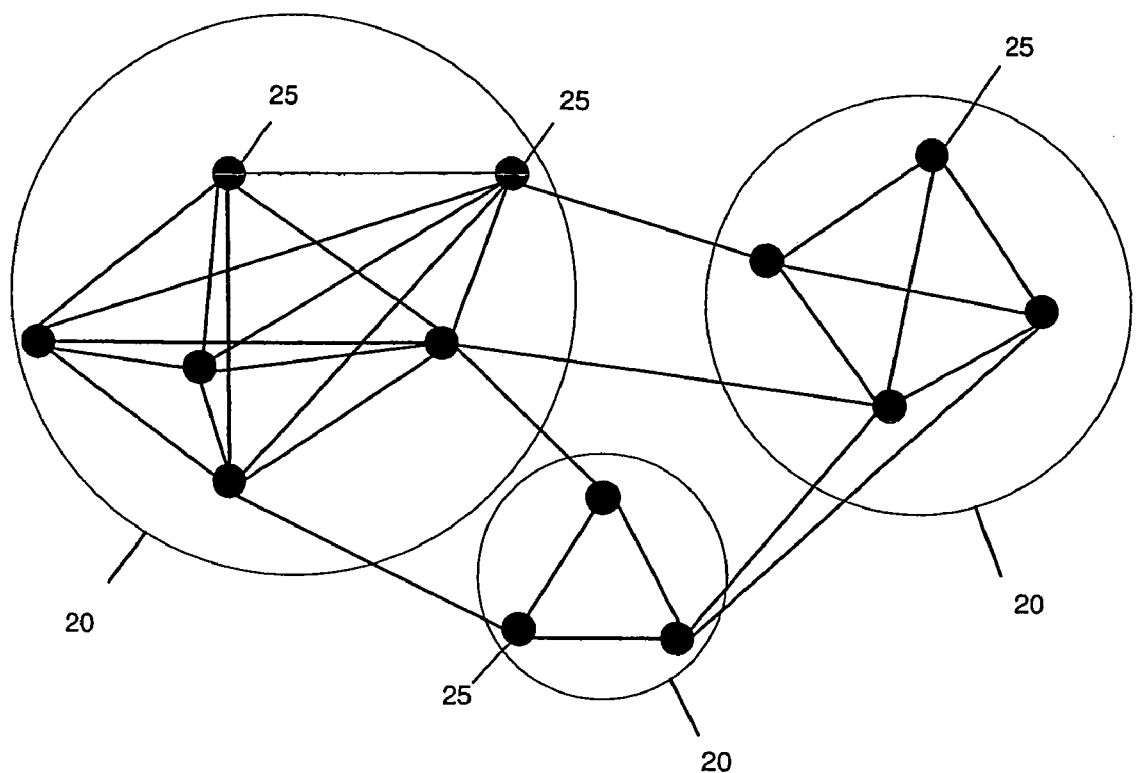
FIG. 1 is a schematic diagram of network connectivity used in prior art BGP networks.

The use of BGP requires full interconnectivity between network devices within a single domain. FIG. 1 provides an illustration of a network with full intradomain connectivity as required by BGP. Within a single domain 20, each network device 25 makes connection with each other network device 25 within that domain. Other modifications of the intradomain topology are made possible using meshes or confederations.

Figure 2:
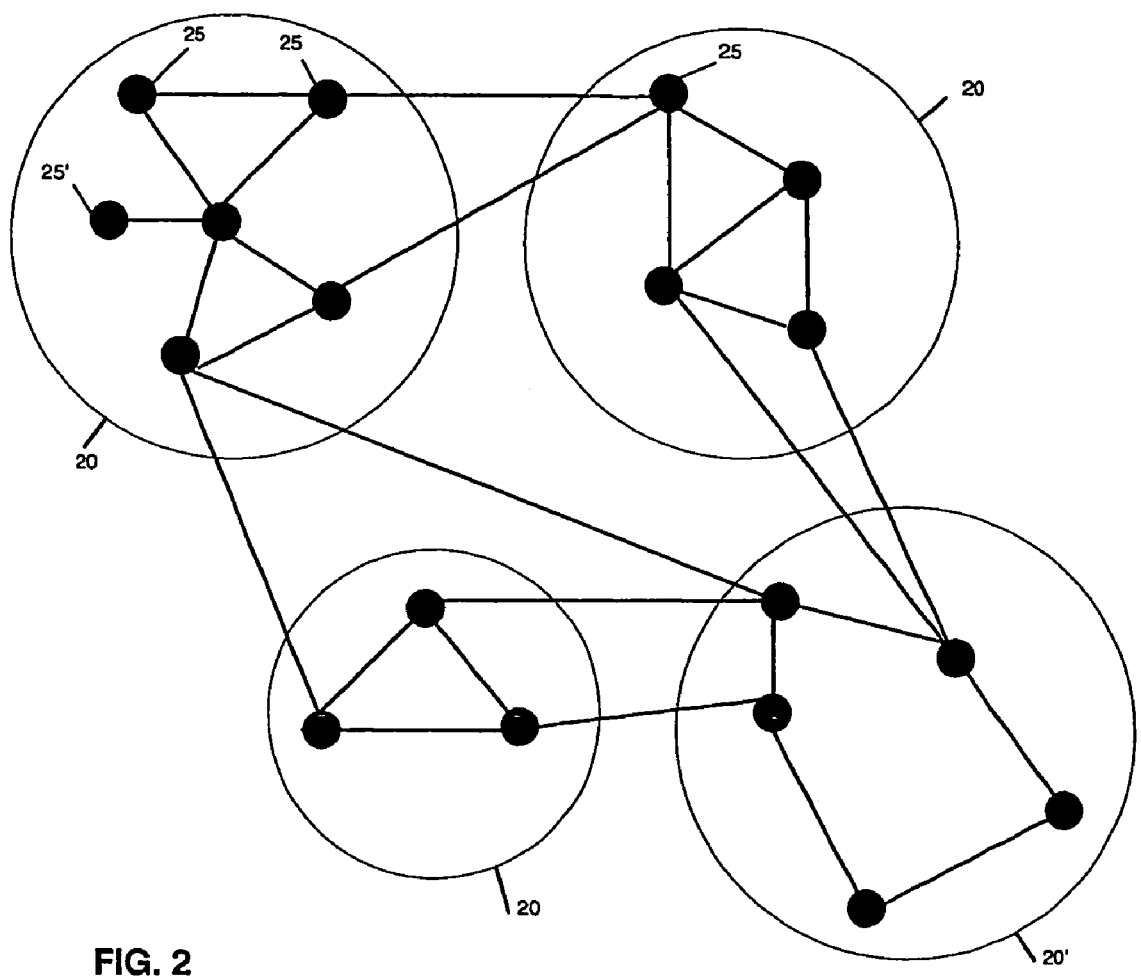
FIG. 2 is a schematic diagram of network connectivity that may be used in accordance with embodiments of the present invention.

In accordance with an embodiment of the invention, greater flexibility in intradomain connectivity is possible. For example, the connectivity shown in the illustration of FIG. 2 may be used when the methods of distributing routing information of the embodiments of the invention are used. With these methods, it is permitted to have a network device 25' connected to no more than one other of the plurality of network devices in the domain. The methods further permit an intradomain connectivity in which the plurality of network devices 25 form a ring as shown in domain 20'.

Figure 3:
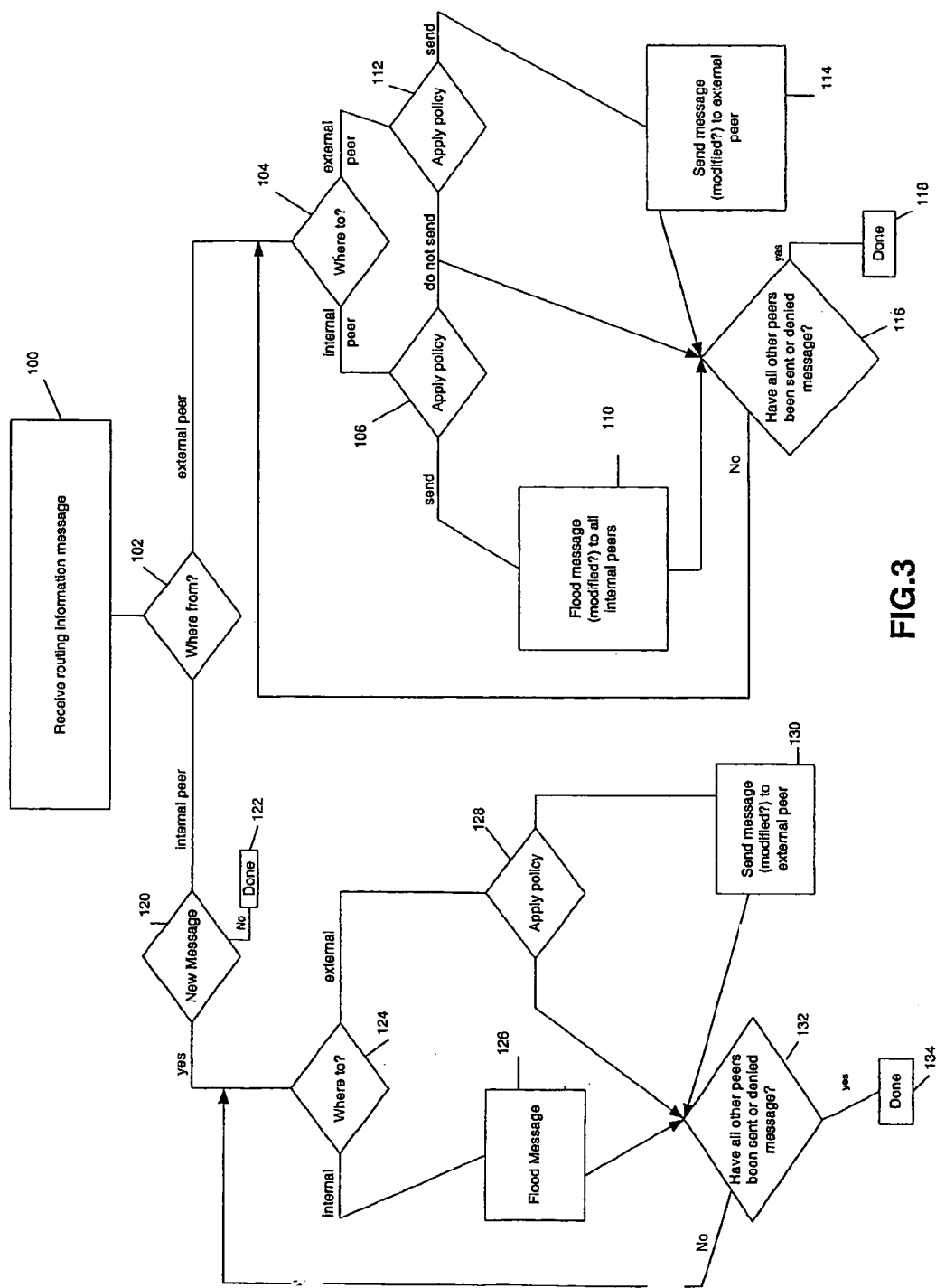
FIG. 3 is a flow chart of actions taken in accordance with embodiments of the present invention.

Referring now to FIG. 3, the distribution protocol of the embodiment of the present invention shall be described. A network device receives a routing information message 100. As is known in the art, the message is identified and parsed. Routing information may include a route from one domain to another to get to a destination domain, capability information or signaling protocols such as telephone signaling protocols or multimedia signaling protocols. The action to be taken by the device receiving such a message depends on whether it came from one of its internal peers or an external peer 102. A peer is a directly connected network device. An internal peer is a network device belonging to the same domain as the receiving network device. An external peer is a network device in a different domain. Each routing information message that is received will be considered for sending to each of the other peers of the receiving network device. The actions taken depend on where the message is to be sent 104, 124. For a routing information message received from an external peer and considered for sending to an internal peer, the network device will apply the policies that have been set for it by the network administrator for the domain to which it belongs. Application of policy is performed through a policy software module 106 as is known in the art. In this manner, policies filter out some messages and information. This may result in the determination that such message is not for distribution within the domain, in which case no further action is taken with respect to sending the message to other internal peers. The policies may result in modifying the routing information message or leaving it the same, in both cases permitting distribution to the remaining internal peers. In that case, according to an embodiment of the invention, the filtered routing information message is flooded to all the internal peers in the domain. Link state software module 110 accomplishes the flooding. The filtered routing information message may be the same as or a modification of the original routing information message.

Flooding is a well known database synchronization method. Flooding involves forwarding a message to all neighboring network devices within a domain. Flooding protocols add link state advertisement headers to messages so that it can be determined if a message carries new or old routing information. Flooding is only possible in a policy-free area. Flooding is known in a variety of link state mechanisms. For example, OSPF, ISIS, PNNI, APPN and SCSP are all protocols that provide for link state flooding. However, best common practices are not to use link state mechanisms interdomain because they would not scale to interdomain level properly. The embodiment of the present invention provides for policy based distribution interdomain and flooding distribution intradomain.

If the externally received routing information message is considered for sending to another external peer, policy module 112 applies policy. Policy can prevent the message from being sent to an external peer. Each network device is assigned zero, one or more policies to apply to each such message. Application of policy requires passing the message through the assigned policies, if any. If the message passes through the policy filter, it is sent to the external peer, although its contents may be modified 114. All peers, other than the original peer, are considered for receiving the message 116. The process is completed 118 after all such peers have received the message or been denied the message.

Routing information messages received from internal peers will be treated in accordance with a flooding mechanism. As in conventional flooding mechanisms, the link state advertisement header is reviewed to determine whether the message is to be treated as a new message 120. If the message is old, it need not be processed further 122. The various link state mechanisms have ways of selecting which messages are new and which are old and breaking ties, if necessary. As for the internal peers 124, if the message is determined to be new, it is flooded to the remaining internal peers. Link state software module 126 accomplishes the flooding. When considering forwarding the message to an external peer, policy module 128 will apply policy. The message is filtered and possibly modified in accordance with the policies of the network device. If policy permits, the message, possibly modified, is sent with an appropriate header to the external peers 130. The link state advertisement header may be deleted, written over, replaced or ignored and a header for the external communication may be added to the message. When all peers have been either forwarded the message or denied the message 132, all processing of the internally received message is complete 134.

A presently preferred embodiment of a protocol for providing policy based interdomain distribution and intradomain flooding shall now be described. While this particular embodiment is ideally suited for routing IP multimedia signaling, embodiments of the invention may be adapted as well for other wide area networks. The routing information exchanged between network devices of the presently preferred embodiment includes such information as reachability of connecting destinations, the routes towards these destinations and information about gateways towards those telephony destinations residing in the PSTN.

Network devices exchange sufficient routing information to construct a graph of domain connectivity so that routing loops may be prevented. In addition, the distribution protocol can be used to exchange attributes necessary to enforce policies and to select routes based on path or gateway characteristics. The present embodiment uses BGP's interdomain transport mechanism, BGP's peer communication, BGP's finite state machine and other similar formats and attributes to the BGP. Unlike BGP, however, the present embodiment includes intradomain flooding which therefore removes adjacency requirements simplifying the network device connectivity requirements within a domain. Thus, scaling the present embodiment protocol to large domains is far simpler than is the case for BGP with its connectivity restrictions.

The general operation of the distribution protocol is for peer network devices to form a transport protocol connection between one another. They exchange messages to open and confirm the connection parameters and to negotiate the capabilities of each network device as well as the type of information to be advertised over this connection. To ensure that peers are operational keep alive messages are sent between them periodically. If a connection encounters an error condition, a notification message is sent and the connection is closed.

Once the peer connection has been established, the initial data flow is the network device's entire internal signaling routing table. Incremental updates are sent as the signaling routing tables change.

As already discussed above, the protocol distinguishes between internal and external peers. Within a domain, link state mechanisms are used to flood database updates over an arbitrary topology of network devices. Externally, the protocol uses point-to-point peering relationships to exchange database information. Such external exchanges are subject to local policies. When an update is received from an internal peer, the routes and updates are checked to determine if they are newer than the version already in the database 120. Each link state advertisement header has a record ID uniquely identifying the routing information and a sequence number indicative of when the routing information message was created. Old messages can thus be ignored. If two messages are received with the same record ID and sequence number, the protocol may resort to determining the check sum for each message. This may reveal corrupt data that may be ignored. Other mechanisms may also be utilized to pick one of two messages having the same record ID and sequence number, in accordance with known link state protocols. Newer routing information is then flooded to all other peers in the same domain.

Typically, each network device maintains a database for storing the routing information. Pointers or multiple copies of the information may be used to divide the information into distinct parts. One part may store the raw signaling routing information learned from inbound update messages. The routing information should be stored in a manner so that it may be accessed on the basis of which peer provided the information. The information should also be accessible according to routing destination addresses. A second part contains the local routing information that the network device has selected by applying local preferences to the raw signaling routing information. A third part stores information for advertisement to external peers filtered in accordance with defined policies.

Each message between internal peers includes a link state advertisement header with information that properly identifies the message as a message and provides the length of the message. The header further includes identification of the sending network device. In order to facilitate flooding, update messages also include identification of the originator of the update, a record ID and a sequence number. The link state advertisement header facilitates the correct and efficient distribution of routing information among internal peers.

The local preference attribute allows a network device in a domain to calculate a preference for a route and to communicate this preference to other network devices in the domain. The local preference typically expresses a real world cost that is flooded throughout the domain to inform the internal peers that the cost exists. During route selection, a network device may determine its own preference for a route received from an intradomain network device or it may use the local preference attribute as its preference or it may refer to a combination of these factors to generate a preference. A network device must include the local preference attribute when originating a message for peer devices within its own domain. The network device must not include the local preference attribute when communicating with network devices in other domains. Local preference attributes received from interdomain peers must be ignored.

The network devices may be designed to operate in terms of a finite state machine. The states may include an idle state, a connect state, an active state, an open/sent state, an open/confirm state and an established state.

Messages from internal peers are flooded to the other internal peers. Flooding efficiently synchronizes the routing information databases of all the network devices within a domain without placing constraints on the domain's internal connectivity. The record ID, sequence number and originating network device identifier are used to determine whether the route information message is new or old. Old information is ignored. It is preferred for expedited flooding, but not required, that all routes received in a single update message that are found to be new be forwarded to all other internal peers in a single update message. Record ID's and sequence numbers are assigned by the originating network devices. A network device originates a new route and associates it with a record ID. For a new record ID, a sequence number that is a minimum number may be assigned. Each time the route is updated within the domain by the originator, the sequence number must be incremented. A simple method for determining whether a route is new is to compare sequence numbers.

A policy module operates as in BGP to select externally received routing information for subsequent advertisement within a domain. The policy module is also utilized in determining which internally flooded routing information is to be advertised to an external peer. A policy may prevent dissemination of certain routing information within a domain or to certain external peers. A policy may instead be such as to modify routing information and permit dissemination of the thus filtered routing information.

It should be noted that although a IP multimedia protocol is discussed, various embodiments of the invention may be implemented for specific uses such as IP telephony or other uses, such as with data routers. Accordingly, discussion of a IP multimedia signaling routing protocol is by example and not intended to limit the scope of preferred embodiments of the invention.

Among the advantages provided by preferred embodiments is the ability to configure a single, policy based domain in any arbitrary topology or connectivity. For example, unlike current intradomain BGP connectivities, routers within a single domain may be connected in ways other than a full mesh or route reflector.

Many embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits and digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet 108 or World Wide Web).

Each of the following documents is hereby incorporated herein, in its entirety, by reference.

(1) J. Rosenberg and H. Schulzrinne, "A Framework for a Gateway Location Protocol" IETF Internet Draft, draft-ietf-iptel-gwloc-framework-03.txt, Work in Progress, June 1999.

(2) Y. Rekhter and T. Li, "A Border Gateway Protocol 4 (BGP-4)," IETF RFC 1771, March 1995.

(3) J. Moy, "Open Shortest Path First Version 2," IETF RFC 2328, April 1998.

(4) J. Luciani, et al., "Server Cache Synchronization Protocol (SCSP)," IETF RFC 2334, April 1998.

(5) International Telecommunication Union, "Visual Telephone Systems and Equipment for Local Area Networks which Provide a Non-Guaranteed Quality of Service," Recommendation H.323, Telecommunication Standardization Sector of ITU, Geneva, Switzerland, May 1996.

(6) M. Handley, H. Schulzrinne, E. Schooler, and J. Rosenberg, "SIP: Session Initiation Protocol," IETF Internet Draft, draft-ietf-mmusic-sip-12.txt, Work in Progress, January 1999.

Although various exemplary embodiments of the invention have been disclosed, it should be apparent to those skilled in the art that various changes and modifications can be made which will achieve some of the advantages of the invention without departing from the true scope of the invention.

We claim:

1. A method of distributing routing information through a plurality of network devices, the plurality of network devices being members of a domain having a defined policy relating to forwarding of routing information, the method comprising:

receiving an information message at a network device in the domain, the information message having routing information including information selected from a group including a route and a signaling protocol the route including a destination;

responsive to the information message being received from a network device external to the domain modifying the routing information by applying the defined policy of the domain to the routing information to produce policy filtered routing information, wherein the policy filtered routing information is selectively flooded to network devices internal to the domain responsive to the defined policy and the destination of the route; and responsive to the information message being received from a network device internal to the domain, flooding the routing information to each of the plurality of network devices.

2. The method as defined by claim 1 wherein the plurality of network devices are in a ring connectivity.

3. The method as defined by claim 1 wherein the plurality of network devices comprises at least three network devices, the at least three network devices including a defined network device that is connected with no more than one other of the plurality of network devices.

4. The method as defined by claim 1 wherein the step of selectively flooding the policy filtered routing information comprises adding a link state advertisement header to the policy filtered routing information.

5. The method as defined by claim 1 wherein the policy filtered routing information comprises the received routing information in the information message.

6. The method as defined by claim 1 further comprising storing the routing information in local data storage.

7. The method as defined by claim 1 wherein the defined policy is set by an administrator.

8. An apparatus for distributing routing information to a plurality of network devices, the plurality of network devices being members of a domain shared by the apparatus, each of member of the domain operating in accord with a defined policy relating to forwarding of routing information, the apparatus comprising:

an input coupled for receiving an information message having routing information the routing information selected from a group including a route and a signaling protocol, the route including a destination;

a policy module coupled with the input, the policy module operable to apply the defined policy of the domain only to information messages that are either received from or destined for network devices external to the domain to produce policy filtered routing information;

an output coupled with the policy module, the output selectively flooding the policy filtered routing information to each of the plurality of network devices in accordance with the defined policy and the destination of the route; and flooding logic for flooding the received information message to the plurality of network devices responsive to the information message being received from a network device internal to the domain.

9. The apparatus as defined by claim 8 wherein the plurality of network devices are in a ring connectivity with the apparatus.

10. The apparatus as defined by claim 8 wherein the plurality of network devices comprises at least three network devices, the at least three network devices including a defined network device that is connected with no more than one other of the plurality of network devices.

11. The apparatus as defined by claim 8 further comprising a link state module for adding a link state advertisement header to the policy filtered routing information.

12. The apparatus as defined by claim 8 wherein the policy based routing information comprises the received routing information in the information message.

13. The apparatus as defined by claim 8 further comprising memory for storing the routing information.

14. The apparatus as defined by claim 8 wherein the defined policy is set by an administrator.

15. A computer program product for use in a network device in a domain of network devices, the computer program product comprising a computer usable medium having computer readable program code thereon, the computer readable product code comprising:

program code for receiving an information message having routing information from a network device, the routing information selected from a group including a route and a signaling protocol, the route including a destination;

program code operable to either apply a defined policy of the domain to the information message if the information message was forwarded by an external peer network device external to the domain to provide policy filtered routing information, or to flood the information message if the information message was forwarded by an internal peer network device internal to the domain; and program code for selectively flooding the policy filtered routing information to each peer network device in the domain in accordance with the defined policy of the domain and the destination associated with the route.

16. The computer program product as defined by claim 15 wherein the domain of network devices are in a ring connectivity.

17. The computer program product as defined by claim 15 wherein the domain of network devices comprises at least three network devices, the at least three network devices including a network device that is connected with no more than one other of the plurality of network devices.

18. The computer program product as defined by claim 15 wherein the program code for flooding comprises program code for adding a link state advertisement header to the policy filtered routing information.

19. The computer program product as defined by claim 15 wherein the policy filtered routing information comprises the received routing information in the information message.

20. The computer program product as defined by claim 15 further comprising program code for storing the routing information in local data storage.

21. The computer program product as defined by claim 15 wherein the defined policy is set by an administrator.

22. A network device in a domain operating in accord with a defined policy relating to routing information, the network device comprising:
- an input coupled with a network device, the input receiving an information message from the network device, the information message having routing information selected from a group including a route and a signaling protocol, the route including a destination;
- a policy module coupled with the input, the policy module operable to apply the defined policy of the domain only to information messages that are either received from or destined for network devices external to the domain to produce policy filtered routing information; and
- an output coupled with the policy module, the output selectively flooding the policy filtered routing information to each peer network device in the domain in accordance with the defined policy of the domain and the destination of the route;
- flooding logic for flooding the received information message to the peer network devices in the domain responsive to the information message being received from a network device internal to the domain.

23. The network device of claim 22 further comprising a link state module for adding a link state advertisement header to the policy filtered routing information.

* * * * *